United States Patent [19]
Burmistrov et al.

[11] Patent Number: 5,059,495
[45] Date of Patent: Oct. 22, 1991

[54] ELECTRIC BATTERY

[75] Inventors: Oleg A. Burmistrov; Igor A. Aguf; Nikita J. Lyzlov; Martin A. Dasoian; Galina V. Krivchenko, all of Leningrad, U.S.S.R.

[73] Assignee: Vsesojuzny Nauchno-Issledovatelsky Proektno-Konstruktorsky I Tekhnologichesky Akkumulyatorny Institut, Leningrad, U.S.S.R.

[21] Appl. No.: 498,468

[22] Filed: Mar. 22, 1990

Related U.S. Application Data

[63] Continuation of Ser. No. 290,148, Dec. 23, 1988, abandoned.

[30] Foreign Application Priority Data

Dec. 25, 1987 [SU] U.S.S.R. ............................... 4348660

[51] Int. Cl.$^5$ ............................................. H01M 2/16
[52] U.S. Cl. ...................................... 429/57; 429/144
[58] Field of Search .................................. 429/57, 144

[56] References Cited

U.S. PATENT DOCUMENTS 3,930,890 1/1976 Dietz ................................. 429/57 X
4,192,908 3/1980 Himy et al. ..................... 429/144 X
4,442,508 5/1984 Jensen ................................... 429/57

FOREIGN PATENT DOCUMENTS 1471307 4/1977 United Kingdom .

Primary Examiner—Stephen J. Kalafut
Attorney, Agent, or Firm—Lilling and Lilling

[57] ABSTRACT

In an electric battery with an aqueous electrolyte, a separator matrix includes three layers with a hydrogen-/oxygen recombination catalyst inserted into the middle layer.

1 Claim, 1 Drawing Sheet

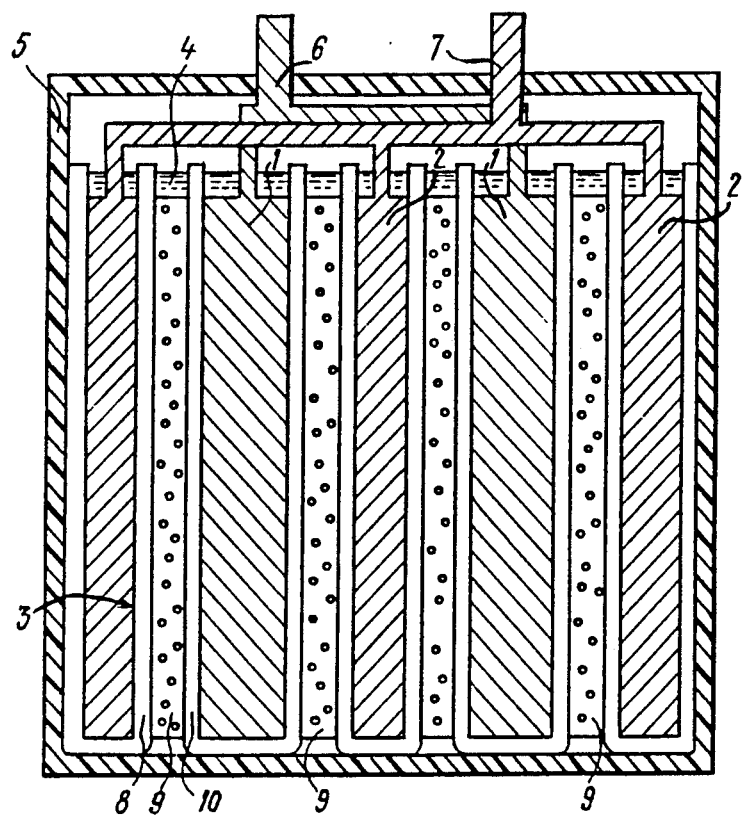

5,059,495

ELECTRIC BATTERY

This is a continuation of Ser. No. 07/290,148 filed on Dec. 23, 1988 now abandoned, and is related to Soviet Application 4348660 filed on Dec. 25, 1987.

FIELD OF THE INVENTION

The present invention relates to electrical engineering, and more particularly to electric batteries, and can be used in any secondary chemical current sources with an aqueous electrolyte.

BACKGROUND OF THE INVENTION

To enable the secondary chemical current sources with an aqueous electrolyte to be sealed, a catalyst is added that speeds up recombination of hydrogen and oxygen evolved on the electrodes of these current sources, as they are charged.

Know in the art is a sealed-in lead-acid electric battery (GB, A, 1471307) comprising a stack of electrodes, a separator, an aqueous electrolyte, and a catalyst. The catalyst is formed by a number of spherical bodies composed of a mixture of carbon, platinum or palladium, and fluoroethylene polymer, which are freely floating on the electrolyte surface in the below-cover space of the battery. When the hydrogen and oxygen generated in the process of charging the battery contact the catalyst bodies, they are recombined to form water which is returned to the electrolyte.

The disadvantage of the above battery resides in that the spherical bodies of the catalyst, while allowing utilization of the gases evolved, cause the weight-specific electrical characteristics of the battery to degrade, since the material of the bodies is not an active substance of the battery.

Also known in the art is a sealed-in battery (JP, B, 54-24096) comprising positive and negative electrodes, separator matrices located between the oppositely poled electrodes, an aqueous electrolyte of silicon oxysulphide in gel form, and a hydrogen/oxygen recombination catalyst. The catalyst is formed by a plate made of a metal of platinum group, disposed in the gas space of the battery and electrically connected to the negative electrodes. To reduce the hydrogen evolution in the process of charging the battery and to absorb the oxygen evolved on the positive electrodes, the negative electrodes contain an excess of active material, i.e. their mass exceeds that required for the normal discharge of the battery by 40%.

Similarly to the first-mentioned design, this battery includes an extra element, i.e. the catalyst plate that is not involved in the basic cell reaction. This results in a complicated battery construction and in degradation of its specific electrical characteristics compared to open-type batteries.

SUMMARY OF THE INVENTION

It is an object of the present invention to improve specific electrical characteristics of an electric battery, while maintaining it in its sealed form.

Another object of the invention is to simplify the electric battery construction.

A further object of the invention is to provide an electric battery wherein the insertion of the hydrogen/oxygen recombination catalyst would not entail an increased volume and weight of the battery.

With these and other objects in view, there is provided an electric battery comprising a positive electrode, a negative electrode, a separator matrix interposed between the electrodes, and an aqueous electrolytic solution. The separator matrix includes three layers with a hydrogen/oxygen recombination catalyst added to the middle layer.

In the proposed battery, the catalyst is an integral part of the separator and, as experimentally shown, the thickness of the separator matrix remains unchanged after the catalyst-containing layer has been added thereto. The battery is free from components such as the plate in the known battery mentioned above, which is not indispensable for the cell reaction. Consequently, the specific weight and volume electrical characteristics of the battery are improved and the construction simplified.

These and other objects and advantages of the proposed invention will be more apparent from the detailed description of its preferred embodiment taken in conjunction with the accompanying drawing, wherein:

BRIEF DESCRIPTION OF THE DRAWING

A sectional view of the proposed electric battery is represented in the drawing.

DETAILED DESCRIPTION OF THE PREFERRED EMBODIMENT OF THE INVENTION

The electric battery comprises positive electrodes 1 and negative electrodes 2, and a separator matrix 3 disposed between the positive and negative electrodes of each pair of electrodes. The electrodes 1 and 2 and the separator matrices 3 make up an electrode assembly immersed in an aqueous electrolytic solution 4. The electrode assembly is inserted into the body 5 of the battery with a slight force to ensure the tight fit between the matrices 3 and the electrodes 1 and 2, and is then hermetically sealed. The positive electrodes 1 are electrically connected to one another and to a positive terminal 6. The negative electrodes 2 are also electrically connected to one another and to a negative terminal 7. The terminals 6 and 7 extend beyond the battery body 5.

Each separator matrix 3 is composed of a porous, electrically nonconductive material, such as felt made of ultra-thin glass fibres, polypropylene, etc., and comprises three layers 8, 9, and 10. Inserted into the middle layer 9 having no contact with the electrodes 1 and 2 is a hydrogen/oxygen recombination catalyst formed by finely dispersed platinum or some other material exhibiting catalytic activity in the recombination reaction. The thickness of the catalytic layer 9 and its catalytic material content are determined by the required recombination rate for hydrogen and oxygen. So in the case of lead-acid batteries, if platinum is used, it is desirable that the thickness of the catalytic layer 9 be no less than half the overall thickness of the matrix 3, and the platinum content of the layer 9 be about 1 mg/cm$^3$.

The thickness of the outer layers 8 and 10 of each matrix 3 is chosen according to the ability of the catalyst particles to permeate through its material, aiming, on the one hand, to provide an efficient supply of hydrogen and oxygen into the region of the catalytic layer 9 and, on the other hand, to avoid penetration of the catalyst into the electrodes 1 and 2, which would otherwise prevent the basic cell reaction from occurring at the electrodes of the battery, as it is charged.

The overall thickness of the separator matrix 3 is dependent on the battery type. To illustrate, for lead-acid batteries, the matrix thickness is determined by the required amount of sulphuric acid in the electrolyte; while for silver-zinc storage batteries, the lower limit of the matrix thickness is set by dendrite penetration (zinc and silver needles penetrating towards each other). The insertion of the catalyst-containing layer 9 does not add to the overall thickness the separator matrix, since this layer, being a catalyst carrier, combines with the layers 8 and 10 to perform the main function of the separator, i.e. separation of electrodes.

In the preferred embodiment of the invention, as shown in the drawing, to improve manufacturability of the electrode assembly, the outer layers 8 and 10 of the adjacent matrices 3, facing each other, are made of a single sheet bent under the lower end of the respective electrode 1 or 2.

The insertion of the catalyst into the middle layer 9 of the separator matrix 3 can be accomplished in a number of ways, e.g. dispersion of metallic catalyst salt into the matrix pores followed by chemical reduction to metal, or else, filtering the catalyst suspension particles through the porous material of the matrix, etc.

While the drawing shows a battery having two positive electrodes 1, three negative electrodes 2, and four separator matrices 3, the number of these elements may be different, the simplest case being two oppositely poled electrodes with the separator matrix of the above type disposed therebetween. In addition, the battery electrolyte may be not only in a free state, as shown in the drawing, but in an immobilized state as well.

The operation of the battery is as follows.

As the battery is charged, apart from the main cell reaction, a side reaction takes place at the positive electrodes 1, which is accompanied by oxygen evolution:

$$H_2O \rightarrow 2H^+ + \tfrac{1}{2}O_2 \uparrow + 2\bar{e} \text{ (in acid electrolyte)}$$

or $$2OH^- \rightarrow H_2O + \tfrac{1}{2}O_2 \uparrow + 2\bar{e} \text{ (in alkaline electrolyte)}$$

Similarly, at the negative electrodes 2, apart from the main cell reaction, there is a side reaction accompanied by hydrogen evolution:

$$2H^+ + 2\bar{e} \rightarrow H_2 \uparrow \text{ (in acid electrolyte)}$$

or $$2H_2O + 2\bar{e} \rightarrow H_2 \uparrow + 2OH^- \text{ (in alkaline electrolyte)}$$

Oxygen diffuses towards the catalytic layer 9 of the separator matrix 3 through the pores of its layer 10, while hydrogen diffuses through the pores of the layer 8. In the layer 9, oxygen recombines with hydrogen to form water:

$$2H_2 + O_2 \rightarrow 2H_2O$$

The water is returned to the electrolyte 4.

If, in charging the battery, oxygen and hydrogen are evolved in a nonstoichiometric relationship, the excessive oxygen, as it passes through the separator matrix 3, causes the material of the negative electrode 2 to be oxidized.

As the battery is discharged, the main cell reaction which is unique for the particular electrochemical system used runs at the electrodes 1 and 2. This reaction is not discussed, as it bears no relation to the objects of the invention. The nature of the cell reactions in the batteries is broadly covered by the references pertaining to secondary current sources.

One advantage of the proposed battery is its simple design due to the absence of additional elements, i.e. catalyst plates, which is made possible by insertion of the catalyst into the separator, the latter being an indispensable member of any battery. Since the volume of the proposed battery is only occupied by elements necessary for running the cell reaction, its specific electrical characteristics are comparable to those of the best open-type batteries. Moreover, the thickness of the separator matrix does not increase as a result of the catalytic layer being added thereto. In fact, it is the same as that required for such battery with no catalyst in the separator.

The proposed design can be used in any secondary current sources with an aqueous electrolyte, such as lead-acid, nickel-cadmium, nickel-iron, etc. batteries. The best effect, however, is achieved in lead-acid batteries which can be implemented in sealed-in form, while maintaining inherently high electrical performance of the open-type batteries. Further, the sealed-in lead-acid batteries, according to the invention, outperform electrically the existing sealed-in lead-acid batteries whose leak-proofness is achieved by using lead-calcium current taps and separator matrices permeable to oxygen.

What is claimed is:

1. An electric battery, comprising: a positive electrode; a negative electrode; an aqueous electrolytic solution; a separator matrix disposed between said positive and negative electrodes and comprising twoouter layers and a middle layer; and a hydrogen/oxygen recombination catalyst inserted into the middle layer of said separator matrix; the platinum content of the hydrogen/oxygen recombination catalyst of the middle layer of the separator matrix being about 1 mg/cm$^3$.

* * * * *